Nov. 28, 1961   J. M. KOEPCKE   3,010,287
ICE MAKING

Filed July 5, 1960   2 Sheets-Sheet 1

INVENTOR.
JOHN MARTENS KOEPCKE
BY Herman Seid
ATTORNEY.

Nov. 28, 1961     J. M. KOEPCKE     3,010,287
ICE MAKING

Filed July 5, 1960     2 Sheets-Sheet 2

INVENTOR.
JOHN MARTENS KOEPCKE
BY Herman Seid
ATTORNEY.

United States Patent Office 3,010,287
Patented Nov. 28, 1961

3,010,287
ICE MAKING
John Martens Koepcke, North Syracuse, N.Y., assignor to Carrier Corporation, Syracuse, N.Y., a corporation of Delaware
Filed July 5, 1960, Ser. No. 40,583
17 Claims. (Cl. 62—132)

This invention relates to ice making, more particularly to control means for use in conjunction with apparatus for making ice cubes.

A variety of equipment has been evolved for producing rectangularly shaped particles of ice of the so-called ice cube form. In forming these ice cubes in commercial quantities, a grid is generally employed containing a plurality of cells confining a volume of the configuration of the ice to be formed, and a movable platen is arranged to close off the bottom of the grid to retain liquid to be frozen within the cells of the grid. Freezing of the liquid in the cells is accomplished by positioning the evaporator of a compression refrigeration system in heat exchange relationship with said cells whereby the liquid to be frozen, confined within the cells, may be cooled to freeze same. After the ice is formed, the platen is lowered to permit harvesting of the ice from the cells of the grid. A preferred ice making apparatus of this type is shown in co-pending application S.N. 40,719, filed by William L. McGrath.

The use of the aforedescribed grid and platen types of ice making apparatus presents a variety of problems centering about the control of: feeding of liquid to be frozen to the cells of the grid; the freezing of this liquid in the cells; and the subsequent harvesting of the formed ice. Among the desiderata involved in providing ice cube making machinery of this grid and platen type, consideration must be given to providing means for effectively breaking the bond between the formed ice and the cell side walls. Additionally the supply of liquid to be frozen to said cells must be terminated during the harvesting cycle, as should the refrigerating action on said cells.

It is with the above problems and desiderata in mind that the present means, including both method and apparatus, have been evolved. The novel control means particularly adapted for use with a grid and platen type of ice making apparatus serves to regulate the flow of liquid to the ice forming cells of the grid; controls the operation of the refrigeration system employed for freezing the liquid to be frozen in the grid cells; further controls refrigeration system operation to effect breaking of the bond between the formed ice and the walls of the grid cells; controls discharge of the formed ice from the grid cells; and acts to re-initiate the ice forming cycle so as to insure adequate and continuous ice production by the apparatus.

It is accordingly a primary object of this invention to provide improved control means permitting efficient, and substantially continuous operation of a grid and platen type of ice forming apparatus.

Another object of the invention is to provide improved control means regulating the flow of liquid to be frozen to the cells of an ice forming grid.

A further object of the invention is to provide improved control means regulating the operation of a refrigeration system employed in conjunction with an ice forming machine so as to facilitate the production of relatively continuous quantities of uniform quality ice.

An additional object of the invention is to provide a control means for use in conjunction with a grid and platen type of ice making machine serving to cause separation of the grid and platen during periods when it is desired to harvest the ice formed in the grid cells.

It is also an object of the invention to provide a control means for ice making apparatus which governs the cycle of ice forming in the apparatus to provide desired quantities of uniform quality ice.

A still further object of the invention is to provide a control means for a grid and platen type of refrigeration apparatus serving to coordinate the supply of the liquid to be frozen; the operation of the refrigeration system; and the harvesting of the formed ice, so as to permit the relatively continuous production of a plurality of uniform ice particles.

These and other objects of the invention which will become hereafter more apparent are attained by provision of a control system for an ice making machine of the grid and platen type. The novel control system regulates the operation of a water supply system pumping water from a supply sump to the grid cells; regulates the operation of a compression refrigeration system arranged to effect freezing of the water supply to the grid cells; and subsequently after formation of ice of desired quality in the grid cells effects separation of the grid and platen to harvest the formed ice. This cycle is regulated by the novel control means which maintains the ice making apparatus functioning continuously if desired. The ice making grid is provided with a platen which co-acts with the grid to maintain liquid to be frozen in the cells of the grid. The liquid to be frozen is supplied to the grid cells, and a compression refrigeration system is employed to effect freezing of the liquid in the grid cells to form the desired ice. Upon completion of the freezing of liquid in the cells, the novel control means acts to free the formed ice from the grid cells by directing a heat dissipating medium into heat exchange relationship with the grid cells to break any bond between the formed ice and the cells. At this time, the control means initiates movement of the platen away from the grid, which permits the formed ice to be released from the grid cells. The novel control means maintains the operation of a grid and platen type of ice making machine to provide for continuous operation by providing for a freezing cycle, a defrost cycle and a harvest cycle. During the freezing cycle the control means maintains a continuous supply of liquid to be frozen to the cells of the grid, maintains the platen against the grid so that liquid to be frozen will be retained in the cells thereof, and maintains the flow of a heat absorbing medium in heat exchange relationship with the liquid to be frozen in the grid cells. Upon completion of the freezing, the defrost cycle is initiated by directing a heat dissipating medium into heat exchange relationship with the ice formed in the grid cells and stopping the flow of the heat absorbing medium into heat exchange relationship with said cells. During the defrost cycle any bond between the walls of the cell and the formed ice is broken. Thereafter harvesting is initiated by the novel control means which stops the flow of liquid to the cells and causes the platen to move away from the grid to discharge the ice from the cells thereof. Upon completion of the harvesting cycle, the aforedescribed freezing cycle is again initiated.

An important feature of the invention resides in the fact that the novel control means serves to maintain a relatively continuous supply of ice by virtue of the efficient cycling of the ice forming equipment.

Another feature of the invention resides in the fact that the control means so regulates the freezing operation that ice of uniform quality is produced in the grid.

A further feature of the invention resides in the provision of a control means permitting the manual operation of the ice making apparatus so as to enable selective positioning of the apparatus components for cleaning and maintenance purposes.

An additional feature of the invention resides in the fact that the defrosting and harvesting of formed ice is automatically determined as a function of the quality of ice formed. This is accomplished by initiating defrosting in response to pressure conditions in the refrigeration system and ending defrosting and initiating harvesting in response to temperature conditions of the formed ice in the grid.

It is also a feature of the invention to provide control means serving to regulate the head pressure in the refrigeration system utilized for freezing the liquid to be frozen in the grid cells of the ice making apparatus.

The specific structural details and their mode of functioning will be made most manifest and particularly pointed out in clear, concise and exact terms in conjunction with the accompanying drawings, wherein.

Referring now more particularly to the drawings, like numerals in the various figures will be taken to designate like parts.

Figure 1:
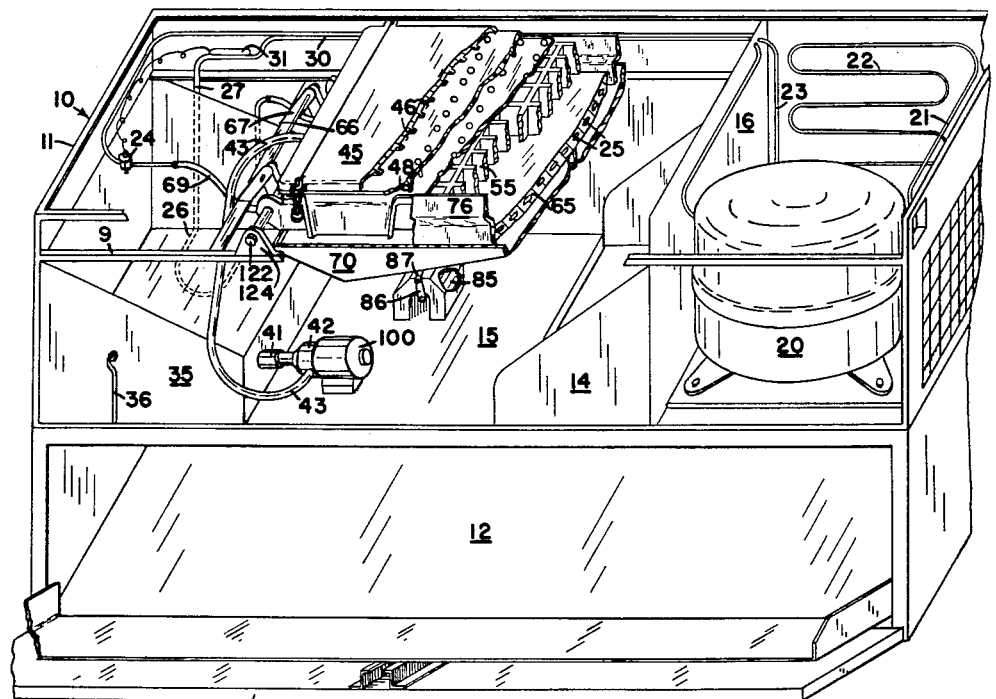
FIGURE 1 is a perspective view of a novel ice making machine, with parts broken away to reveal the details thereof, illustrative of the type of machine to which the instant novel control means may be applied.

The novel ice making machine to which the instant control system is applied is more fully described in the aforementioned co-pending application. The ice making apparatus here shown in FIGURE 1 is arranged within a rectangular housing 11 formed of sheet metal, or the like relatively rigid sheet material supported on a framework 9 of angle irons, or the like. A bunker 12 is formed at the bottom of the housing 11, and provided with a hinged door 13 permitting access to the interior of the bunker 12. Leading to the bunker is a chute 14 extending from an opening in horizontal partition 15 arranged above the bunker 12. Vertical partition 16 extends upwardly from horizontal partition 15 and separates the heat dissipating components of the refrigeration system, to be hereinafter described, from the ice forming equipment, and the water supply equipment, as seen to the left in FIGURE 1.

Figure 2:
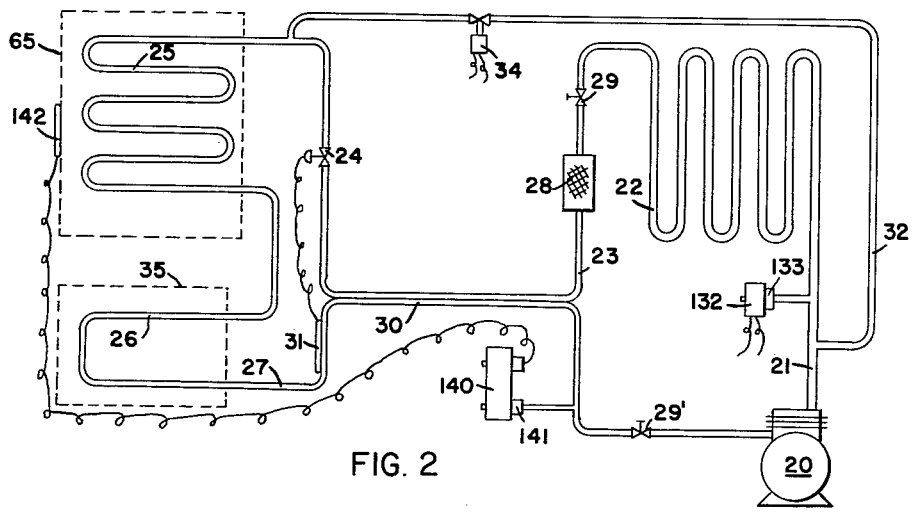
FIGURE 2 is a schematic diagram of a refrigeration system suitable for use in the ice making machine of FIGURE 1 and adapted for control by the instant novel control means.

The refrigeration system which may here be employed with optimum effectiveness as best seen in FIGURE 2 comprises a compressor 20 constituted by a sealed motor compressor unit such as is conventionally employed in compression refrigeration systems. The compressor 20 is coupled via discharge line 21 to condenser 22 which is connected via liquid refrigerant line 23 through thermal expansion valve 24 to primary platen evaporator 25 in series with secondary water precooling evaporator 26, from which suction line 27 extends back to compressor 20 to complete the closed fluid circuit through which refrigerant is circulated. It will be observed that part of liquid line 23, and suction line 27 are arranged in heat exchange relationship at 30.

Expansion valve 24 is controlled by means of thermostatic bulb 31 arranged in heat exchange relationship with suction line 27 so that the amount of refrigerant flowing from the condenser 22 to the evaporator is regulated in response to the temperature of refrigerant in the suction line.

A bypass line 32 is extended from discharge line 21 from a point before condenser 22 to evaporator 25, permitting the flow of compressed refrigerant directly from the compressor to the evaporator. Regulation of the flow of refrigerant through the bypass line 32 is effected by means of solenoid valve 34 the operation of which will be more fully described hereafter in connection with the novel control means.

The water supply circuit here employed as best seen in FIGURE 1 includes a water storage sump 35 to which water is fed by water main connection 36 which feeds water to sump 35 through any desired control valve means. Sump discharge line 41 leads the water from the sump through pump 42 via flexible water header supply line 43 to water distribution header 45. The water header distributes the water to the cells of the ice forming grid 55. Rods 122 mounted in brackets 124 extend through projections from the corners of grid 55 and support the grid on framework 9. A platen 65 is pivotally mounted on rod 66 carried in bearings 67 on framework 9 to close off the bottom of the grid cells so that liquid to be frozen may be retained therein. The particular ice making apparatus here employed is provided with a platen arranged beneath the grid cells, with liquid to be frozen supplied to the grid cells via nozzles 48 on a water header 45, and with a water collection pan 70 beneath the grid and platen as more fully described in the aforementioned co-pending application S.N. 40,719. It will however be appreciated that a variety of other grid and platen types of refrigeration apparatus may be employed.

The platen 65 is of a plate-like configuration substantially coextensive with the bottom area of grid 55, and is preferably formed with a serpentine passageway so as to accommodate the tubing employed in fabricating evaporator 25. The primary portion of evaporator 25 arranged within the serpentine passageway in platen 65 is connected to the secondary evaporator portion 26, and to the suction line of the refrigeration system by flexible refrigerant conduits 69 so as to permit movement of the platen with respect to the relatively fixed refrigeration system components.

Figure 3:
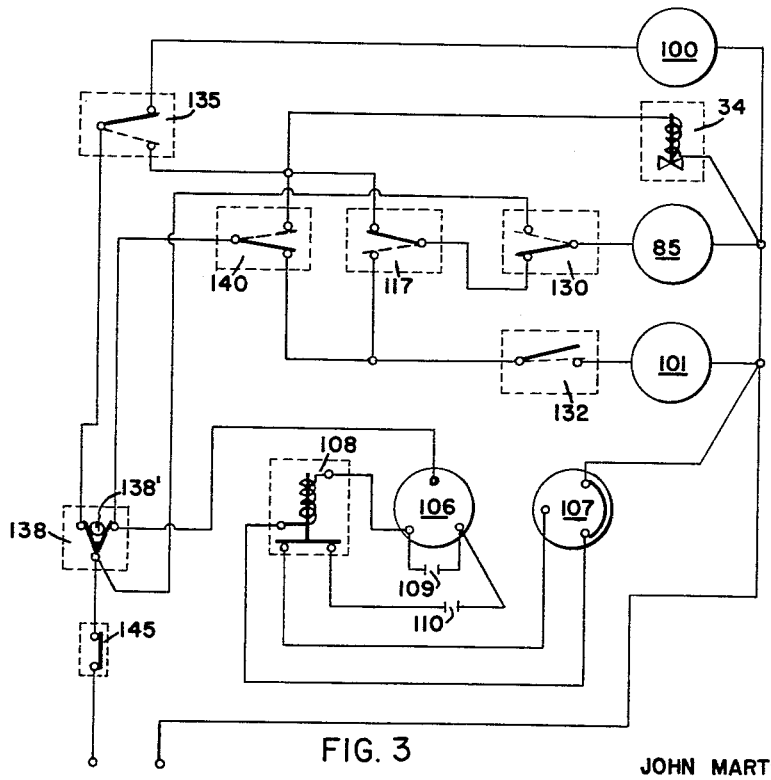
FIGURE 3 is a circuit diagram illustrating the novel control means as applied to the apparatus and refrigeration system of FIGURES 1 and 2 respectively.

The control circuit illustrated diagrammatically in FIGURE 3 controls the operation of the aforedescribed refrigeration system, water supply system and grid and platen ice forming components to attain a continuous supply of uniform ice of desired quality and quantity. An electrical circuit, as shown in FIGURE 3, couples pump motor 100, platen moving gear motor 85 and compressor motor 106.

Coupled to the compressor motor is an overload relay 107, a starting relay 108, a running capacitor 109, and a starting capacitor 110 such as conventionally employed in refrigeration system motor compressor units.

Figure 4:
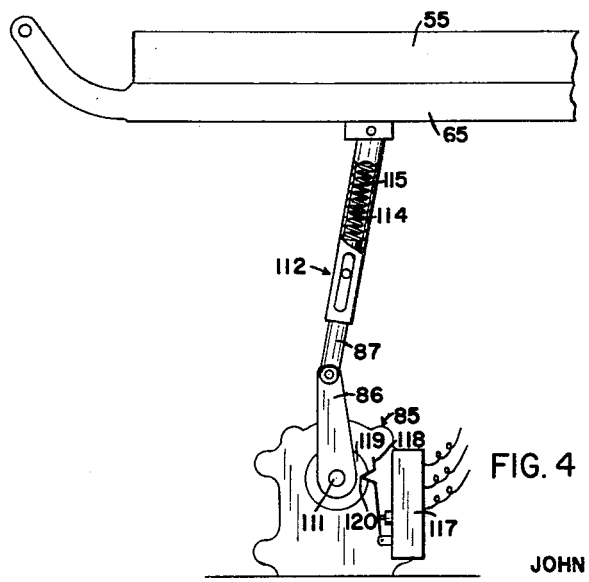
FIGURE 4 is a diagrammatic elevational view of the gear motor and cam switch shown coupled to the platen of the ice forming apparatus of FIGURE 1.

The gear motor 85 utilized for effecting movement of the platen with respect to the plate is coupled to the plate via a crank arm and connecting rod such as more fully described in co-pending application S.N. 40,584, filed in the name of Carl G. Alt, and here shown as illustrated in FIGURE 4. As seen in FIGURE 4 gear motor 85 has a crank arm 86 arranged on the motor shaft 111 whereby the crank arm may be rotated through 360 degrees. Connected to the crank arm 86 is a connecting rod 112 formed preferably of a telescopic tubular configuration with the lower connecting rod portion 87 mounted to slide with respect to the upper connecting rod portion 114. Coil spring 115 is arranged to bias lower connecting rod portion 87 to a distended position with respect to upper connecting rod portion 114 which is pivotally connected to platen 65 in an appropriate fashion such as illustrated. A gear motor cam switch 117 having a single-pole double-throw action is mounted on the motor. A lever 118 is arranged to engage a cam 119 mounted on motor shaft 111 to actuate switch 117.

In addition to the gear motor cam switch 117, the gear motor energizing circuit is provided with a gear motor manual switch 130 as shown in FIGURE 3. Gear motor switch 130 is of a single-pole double-throw type and is provided to permit manual energization of the gear motor for cleaning purposes.

Control of the condenser fan motor 101 is provided by means of a condenser fan switch 132. Switch 132 is of a single-pole single-throw pressure sensitive type. Ranco switch 010–2005 is found suitable for the purpose. As seen in FIGURE 2 the pressure sensitive element 133 of switch 132 is in communication with refrigerant discharge line 21 so as to sense the compressor head pressure, whereby the switching action will be made a function of this head pressure. Solenoid valve 34 is arranged for control of refrigerant flow through the previously described refrigeration system.

A platen switch 135 of a single pole double throw lever action type is arranged in the circuit of pump motor 100 and solenoid valve 34. This platen switch 135 is arranged so as to close the circuit to the pump motor 100 when the platen is in contact with the grid, and simultaneously close the solenoid valve 34. When the platen moves away from the grid, the solenoid valve is energized to open, and the pump motor is de-energized.

A manual control switch 138 is arranged in the circuit to compressor motor 106, pump motor 100, solenoid valve 34, gear motor 85 and condenser fan motor 101. Manual control switch 138 is a three position switch which permits manual control of the ice making apparatus components so as to permit: complete shut off of the unit; operation of only pump motor 100; or operation of all components. When the apparatus is completely shut off, cam 138' is moved to a position where neither contact arm engages a contact. To operate only the pump motor, cam 138' is moved to a position where the left contact is engaged by the left contact arm and the right contact is open. For operation of all components, cam 138' is moved to a position urging each contact arm into engagement with a contact.

Main control switch 140 serves to automatically control the cycles of operation of the ice making apparatus in response to pressure and temperature conditions. Switch 140 is preferably of the Ranco dual control single-pole double-throw type. As seen in FIGURE 2, switch 140 is formed with a pressure sensing cut off element 141 arranged in communication with suction line 27 of the refrigeration system and a temperature sensitive cut-in element 142 arranged to sense the temperature in the grid cells preferably by being fastened to an outside wall of the grid. For convenience the temperature sensitive cut-in element 142 is shown in FIGURE 2 to be mounted on the platen of the instant ice forming apparatus.

A bin switch 145 is mounted in the ice storage bin or bunker and is arranged to control the operation of the ice making apparatus in response to the quantities of ice produced.

The novel control means here provided permit the use of a grid and platen type of ice making apparatus for the relatively continuous formation of desired quantities of uniform quality ice cubes. As previously noted, the term "cube" is employed to designate any desired shape of ice particle, with the particular shape of the ice particle being determined by the volumetric configuration of the grid cells.

In grid and platen types of ice forming apparatus, the liquid to be frozen is fed to the grid cells, and retained therein by means of a movable platen. The supply system for the liquid to be frozen includes a pump pumping the liquid to be frozen from a suitable sump to the grid cells. Refrigeration of the liquid to be frozen in the grid cells is accomplished by means of a compression refrigeration system, the cooling evaporator coils of which are arranged in heat exchange relationship with the grid cells. As described, in the instant arrangement, the refrigeration system is provided with a bypass line permitting the flow of hot refrigerant gas from the compressor into heat exchange relationship with the grid cells to effect defrosting to free the formed ice from any bond it may have with the walls of the grid cells.

The novel control means here provided functions to control the operation of the apparatus through a freezing cycle, a defrosting cycle, and a harvesting cycle, with reinitiation of the aforementioned cycles after every batch of formed ice has been harvested so as to provide relatively continuous ice production.

The freezing cycle in a preferred embodiment of the invention occupies a time period of between 35 and 60 minutes depending on the ambient air temperature and temperature of the liquid to be frozen. The defrosting cycle takes between 2 and 6 minutes depending on the ambient air temperature; and the harvesting cycle takes approximately one-half a minute.

During the freezing cycle, the aforedescribed control switches are in the solid line position illustrated in FIGURE 3. In this solid line position, it will be observed that pump motor 100, and compressor motor 106 are in opeartion. Solenoid valve 34 is closed permitting the flow of refrigerant in its normal refrigeration cycle from the compressor to the condenser to the evaporator.

Depending on ambient temperature conditions, condenser fan motor 101 may or may not be in operation. Pressure sensitive condenser fan switch 132 acts in response to the head pressure in the refrigerant system. When the head pressure falls below a given desired operating point, the fan switch 132 breaks the circuit to condenser fan motor 101 resulting in an increase in temperature immediately surrounding the condenser with a resultant increase in head pressure. Once the desired head pressure is attained, the condenser fan switch makes the circuit to the fan motor to aid in dissipating condenser heat.

As the ice forms in the cells of the grid, the temperatures of the grid and therefore of the grid control bulb or temperature cut-in element 142 become cooler. At a predetermined temperature, approximately 30° F. in an embodiment of the invention, the main control switch 140 mechanically makes ready for initiation of the defrost cycle. Freezing of the water in the cells of the grid continues, however, until the pressure in suction line 27 drops to a predetermined pressure approximately 15 p.s.i.g. At this time, the main control switch 140 trips to the dotted line position shown in FIGURE 3 and the defrost cycle is initiated. In this tripped condition of switch 140, solenoid valve 34 is energized to cause the refrigerant to pass directly from compressor 20 through bypass line 32 to evaporator 25 thereby heating the grid cells and breaking any bond between the formed ice and the cell walls. Simultaneously gear motor 85 is energized to move cam 119 causing the arm of gear motor switch 117 to move to the dotted line position, whereby gear motor 85 is stopped with the platen still contacting the grid and maintaining the hot refrigerant gas flowing through evaporator 25 in heat exchange relation with the grid cells to effect defrosting. The gear motor runs only long enough for lever 118 to ride out from notch 120.

At this time the platen is still in contact with the grid and the defrost cycle is still going on. As the hot refrigerant gases warm the grid, the cut-in temperature of approximately 35° F. in the main control 140 is reached, and the harvest cycle is initiated. When the main control switch 140 switches to the solid line position shown in FIGURE 3, the gear motor 85 is energized, lowering the platen to permit the freed formed ice cubes to be harvested. As the platen lowers, switch 135 is moved to the dotted line position, stopping pump motor 100. The gear motor 85 continues rotating and as the platen is raised to the freezing position, switch 135 is moved to the solid line position, energizing pump motor 100. As the gear motor 85 completes a 360° revolution lever 118 engages in notch 120, and gear motor switch 117 assumes the solid line position shown in FIGURE 3. The apparatus is in position for recycling through the aforedescribed cycle of operation. When a predetermined quantity of ice is collected in the bunker, switch 145 opens discontinuing further operation of the apparatus. After a portion of the collected ice is removed from the bunker, switch 145 closes, energizing the control circuit.

It is thus seen that a novel control means has been provided for use in connection with a grid and platen type of ice forming apparatus to control the operation of the apparatus so as to produce relatively continuous formation of desired quantities of uniform quality ice cubes. The novel control means automatically cycles the apparatus through a freezing cycle, a defrosting cycle, and a harvesting cycle, with automatic control of the supply of liquid to be frozen to the grid cells, the freezing of the liquid, the defrosting of the formed ice in the grid cells to break any bond between the formed ice and the cell walls, and the subsequent movement of the platen with respect to the grid to free or harvest the formed ice. Additionally the control means permits manual selective operation of the components of the apparatus to effect maintenance or cleaning.

The above disclosure has been given by way of illustration and elucidation, and not by way of limitation, and it is desired to protect all embodiments of the herein-disclosed inventive concept within the scope of the appended claims.

I claim:

1. In an ice maker, the combination of a grid containing cells within which liquid to be frozen is confined; a platen movably positioned adjacent the grid to retain the liquid to be frozen in the grid cells; means for moving the platen from a liquid retaining position adjacent the grid cells to an ice discharge position; a supply sump from which liquid to be frozen is fed to the grid cells; means for pumping liquid to be frozen to the grid cells; a refrigeration system including a compressor, a condenser, expansion means and an evaporator, said evaporator being in heat exchange relationship with the grid cells; a compressor motor; first means controlling the freezing of the liquid in the grid cells and the heating of the grid cells to break the bond between the formed ice and the walls of the grid cells in response to pressure conditions in the refrigeration system and temperature conditions of the grid; and second means controlling the platen moving means to effect discharge of the formed ice from the grid cells.

2. An ice maker as in claim 1 including means regulating the flow of liquid to be frozen to the ice forming cells of the grid.

3. An ice maker as in claim 2 in which said regulating means comprise automatically controlled means positioned responsive to the relative position between the grid and platen, whereby upon displacement of the platen relative to the grid the flow of liquid to be frozen to the grid is automatically discontinued.

4. An ice maker as in claim 1 in which said first means comprises: automatically controlled means having an element responsive to pressure conditions in the refrigeration system and an element responsive to temperature conditions of the grid.

5. An ice maker as in claim 1 in which said refrigeration system includes a bypass line communicating the compressor and the evaporator and a valve disposed in said bypass line and in which said first means effects discontinuance of the freezing of the liquid.

6. An ice maker as in claim 1 in which said second means controlling the platen moving means comprises: manually controlled means for selectively effecting movement of the platen with respect to the grid; and automatic control means effecting movement of the platen with respect to the grid in concert with the position of the first means.

7. A method of operating a grid and platen type of ice making apparatus, said method comprising the steps of: regulating the flow of liquid to the ice forming cells of the grid in response to the position of the platen with respect to the grid; refrigerating the grid cells to freeze liquid therein in response to the pressure of the refrigerant and the temperature of the grid cells; heating the grid cells to break the bond between the formed ice and the walls of the grid cells in response to the pressure of the evaporating refrigerant and the temperature of the grid cells; displacing the platen from the grid cells to discharge the formed ice therefrom; and returning the platen to its position adjacent the grid cells.

8. A method as in claim 7 in which the regulation of the flow of liquid to the ice forming cells of the grid includes the steps of: shutting off the flow of liquid when the platen is displaced from the grid; and instituting liquid flow when the platen is in contact with the grid.

9. A method as in claim 7 in which the heating of the grid cells includes the steps of: passing a condensing refrigerant vapor into heat exchange relationship with the grid cells; and simultaneously discontinuing the refrigerating of the grid cells.

10. A method for controlling the operation of a grid and platen type of ice making apparatus, said method comprising the steps of regulating the flow of liquid to be frozen to the grid cells in response to the position of the platen with respect to the grid; regulating the flow of evaporating refrigerant into heat exchange relationship with the grid in response to pressure conditions of the refrigerant and temperature conditions of the grid; regulating the position of the platen with respect to the grid in response to pressure conditions of the refrigerant and temperature conditions of the grid.

11. A method as in claim 10 in which the ice formed in the grid cells is released therefrom by directing condensing refrigerant into heat exchange relationship with the grid cells.

12. A method as in claim 11 in which the directing of condensing refrigerant into heat exchange relationship with the grid cells is controlled in response to pressure of the refrigerant originally employed for freezing of the liquid in the grid cells.

13. In an ice maker, the combination of a grid containing cells within which liquid to be frozen is confined; a platen movably positioned adjacent the grid to retain the liquid to be frozen in the grid cells; a platen moving motor for effecting movement of the platen from a liquid retaining position adjacent the grid cells to an ice discharge position; a supply sump from which liquid to be frozen is fed to the grid cells; a motor driven pump for pumping liquid to be frozen to the gird cells; a compression refrigeration system including a compressor, condenser, expansion means, and evaporator, said evaporator being in heat exchange relationship with the grid cells; a compressor motor; a condenser fan motor; and control means comprising pressure and temperature sensitive switch means arranged in an electrical circuit to the pump motor, the platen moving motor, and the compressor motor; pressure sensing means connected to the suction line to the compressor, said pressure sensing means coupled to said switch means to effect the switching action thereof; and temperature sensing means arranged in heat exchange relationship with the ice in the grid cells, said temperature sensing means coupled to said switch means to effect switching action, whereby operation of the ice forming apparatus is determined by ice formation in the grid cells.

14. An ice maker as in claim 13 in which fan motor switch means are arranged in the circuit to said condenser fan motor; and pressure sensitive means are coupled to said switch means to control the switching action thereof, said pressure sensitive means being arranged in the discharge line from the compressor, whereby the head pressure in the refrigeration system may be controlled.

15. An ice maker as in claim 13 in which switch means are positioned in the circuit to the pump motor; and position sensitive means are coupled to said switch means to effect switching action in response to the relative position between the platen and the grid, whereby the supply of liquid to be frozen to the grid will be discontinued when the platen is separated from the grid.

16. An ice maker as in claim 13 in which bypass means are positioned in the discharge line of the compressor to divert the refrigerant gas therefrom to the evaporator, said bypass means coupled to said pressure and temperature sensitive switch means, whereby upon the formation of ice in the grid cells, said bypass means will be energized to direct condensing refrigerant gas into heat exchange relationship with the grid cells to break the bond between the cell walls and the formed ice.

17. In an ice maker, the combination of a grid containing cells within which liquid to be frozen is confined; a platen movably positioned adjacent the grid to retain the liquid to be frozen in the grid cells; a platen moving motor for effecting movement of the platen from a liquid retaining position adjacent the grid cells to an ice discharge position; a supply sump from which liquid to be frozen is fed to the grid cells; a motor driven pump for pumping liquid to be frozen to the grid cells; a compression refrigeration system including a compressor, condenser, expansion means and evaporator, said evaporator being in heat exchange relationship with the grid cells; a compressor motor; and control means comprising a pressure and temperature sensitive switch arranged in an electrical circuit to the pump motor, the platen moving motor, and the compressor motor; a pressure sensitive element coupled to said switch to effect switching thereof, said pressure sensitive element connected to the suction line to the compressor; and a temperature sensing element in heat exchange relationship with the ice in the grid cells, and coupled to said switch to effect switching action thereof; a position sensitive switch arranged in a circuit to the pump motor; a position sensing element coupled to the platen and to said last-named switch to effect switching action thereof upon separation of the platen from the grid; and three position manual switch means arranged in the electrical circuit to the aforementioned motors to permit selective manual control of the operation of the ice forming apparatus to provide either pump operation, non-operation of the apparatus, or normal ice making operation.

References Cited in the file of this patent
UNITED STATES PATENTS

| | | |
|---|---|---|
| 2,037,417 | Hull | Apr. 14, 1936 |
| 2,259,066 | Gaston | Oct. 14, 1941 |
| 2,563,093 | Bayston | Aug. 7, 1951 |
| 2,612,030 | Ploeger | Sept. 30, 1952 |
| 2,757,520 | Sampson | Aug. 7, 1956 |
| 2,763,993 | Bayston | Sept. 25, 1956 |
| 2,782,609 | Galin | Feb. 26, 1957 |
| 2,891,385 | Nelson | June 23, 1959 |
| 2,949,019 | Roberts | Aug. 16, 1960 |
| 2,949,752 | Bayston | Aug. 23, 1960 |